March 24, 1936.   W. F. HEROLD   2,035,160
BEARING FOR WHEELS AND THE LIKE
Filed April 9, 1934
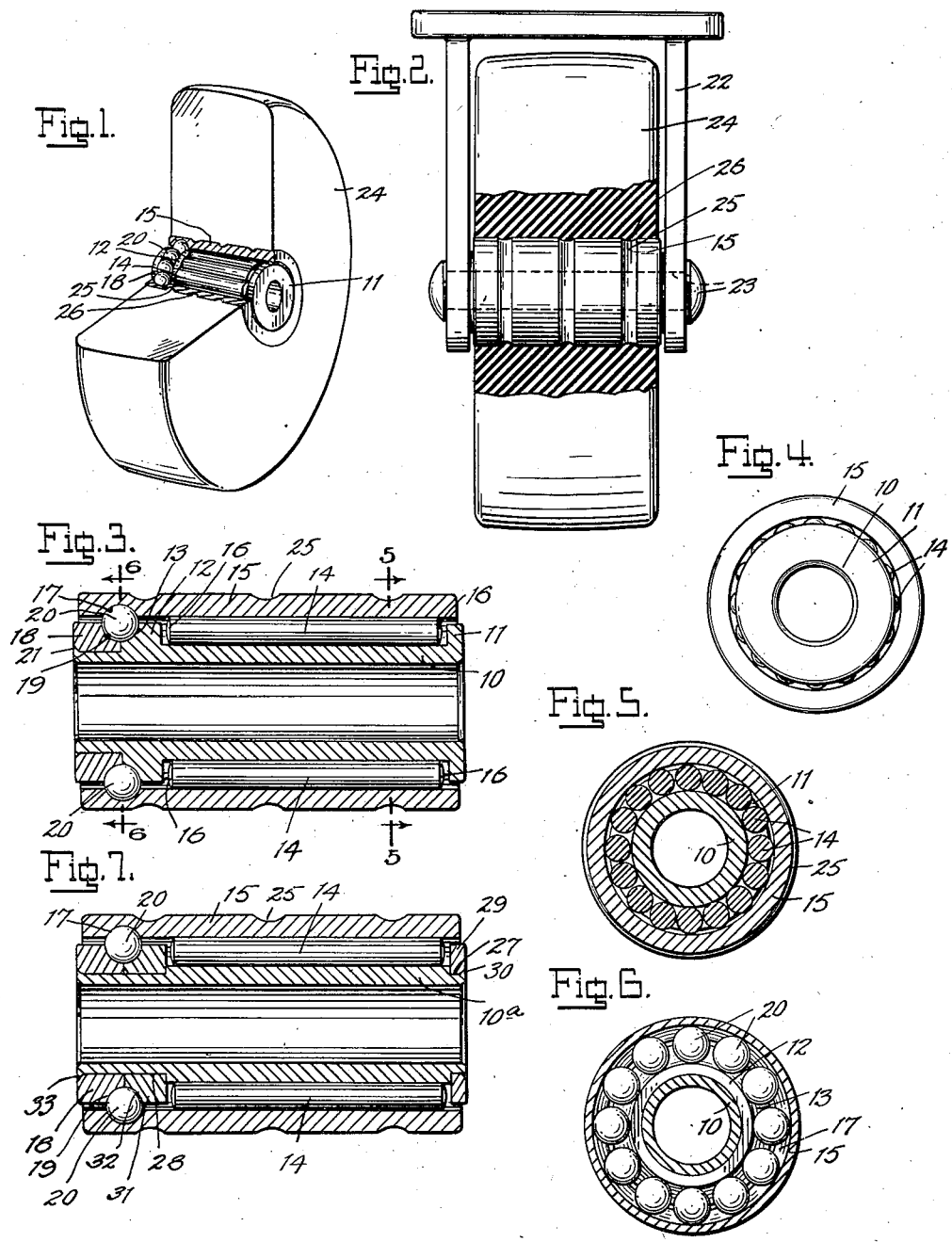
INVENTOR.
WALTER F. HEROLD
BY
ATTORNEY.

Patented Mar. 24, 1936

2,035,160

UNITED STATES PATENT OFFICE 2,035,160

BEARING FOR WHEELS AND THE LIKE

Walter F. Herold, Bridgeport, Conn., assignor to The Bassick Company, Bridgeport, Conn., a corporation of Connecticut Application April 9, 1934, Serial No. 719,689

1 Claim. (Cl. 308—174)

The present invention relates to an improved bearing for wheels and the like, and has for its object to provide a bearing having primary anti-friction means which will efficiently support relatively heavy loads, and in which side thrust will be taken by secondary anti-friction means within the bearing without impairing the load carrying characteristics of the primary anti-friction means. I particularly propose to provide a bearing having a series of anti-friction rollers for supporting the load, and a series of anti-friction balls for taking side trust and maintaining alignment of the relatively movable bearing parts. Another object is provide a bearing which may be economically produced and conveniently assembled, and further to provide a bearing which may with facility be built into a wheel as a permanent part thereof.

With the above and other objects in view embodiments of the invention are shown in the accompanying drawing and these embodiments will be hereinafter more fully described with reference thereto, and the invention will be finally pointed out in the claim.

In the drawing:—

Fig. 1 is a perspective view of a wheel provided with a bearing according to my invention, a quarter-section of the wheel and the outer bearing part being cut away.

Fig. 2 is a front elevation of a caster construction in which the wheel is provided with the bearing according to the invention, a portion of the wheel being shown in section.

Fig. 3 is a longitudinal sectional view of the bearing, according to one embodiment of the invention.

Fig. 4 is an end view thereof.

Fig. 5 is a transverse sectional view, taken along the line 5—5 of Fig. 3.

Fig. 6 is a transverse sectional view, taken along the line 6—6 of Fig. 3.

Fig. 7 is a longitudinal sectional view of a modified form of bearing, according to the invention.

Similar reference characters indicate corresponding parts throughout the several figures of the drawing.

Referring to the drawing, and particularly to Figs. 1 to 6, the bearing, according to the exemplary illustrated embodiment of the invention shown therein, comprises an inner tubular member 10 provided at one end with an outwardly extending flange 11 and provided in inwardly spaced relation to the other end with an annular rib 12, the outer side of which is provided with an annular ball-race groove 13 adapted in the assembled relation of the bearing to constitute half of the inner ball-race. The flange 11, rib 12, and the outer cylindrical surface of the tubular member 10 between said flange and rib form an annular channel constituting an inner race in which a series of relatively long anti-friction rollers 14 are disposed and retained by the outer tubular bearing member 15, the interior diameter of this outer tubular member being slightly larger than the diameters of the flange 11 and rib 12. The rollers are slightly less in length than the space between the flange 11 and rib 12, and their extremities are preferably rounded, as at 16, so that they may roll freely without appreciable frictional contact of their ends with the flange and rib.

The member 15 is provided upon its inner surface in central alignment with the inner wall of the rib 12 with an annular groove 17 constituting an outer ball-race. A collar ring 18 is engaged upon the end of the tubular member 10 against the rib 12 and is provided at its inner end with a groove 19 complementary to the groove 13 and constituting the other half of the inner ball-race, the series of anti-friction balls 20 being disposed between this inner race and the outer ball-race groove 17. The ring 18 is secured by swedging over the end of the tubular member 10, as at 21. In assembling the bearing it will be understood that the balls are inserted in place before engagement and securing of the ring 18.

The outer member 15 is slightly shorter than the inner member 10 and in the assembled relation its ends are slightly spaced inwardly, so that when assembled in a supporting structure, as for instance between sides of a caster horn 22, as shown in Fig. 2, these ends will abut the sides, the latter being drawn tightly against them by a bolt 23 extending between the sides and through the bore of the member 10. In this case the member 10 acts as a supporting strut or spanner bushing between the horn sides. As side movement of the outer tubular member 15 is prevented by the balls 20 the member 15 will at all times be centralized with its ends out of contact with the horn sides.

The wheel 24 may be secured to the outer member 15 of the bearing in any suitable manner, as will be clearly understood. In the case of a wheel formed of plastic material, as for instance a molded rubber wheel as shown in Figs. 1 and 2, the outer surface of the member 15 will preferably be provided with a series of the grooves 25 into which rib portions of the rubber will engage, as at 26, to prevent longitudinal displacement of the wheel. By forcing the outer tubular member 15 into the bore of the wheel while the latter is in a partially completed state, that is while the rubber is still heated, the cooling and setting of the rubber will result in the shrinking of the bore so that the rubber will be firmly bonded to the member 15 and the rib portions 26 will form in the grooves 25.

In the bearing, according to my invention, the load is supported on the rollers 14, which provide an efficient anti-friction support, while side thrust is taken by the balls 20, the latter also constituting a retaining means to hold the outer and inner tubular members 10 and 15 against longitudinal displacement.

In Fig. 7 I have illustrated a modified form of the invention in which the inner tubular member 10$^a$ is provided at its ends with annular shouldered recesses 27 and 28, a ring 29 being engaged in the recess 27 and secured by swedging the end of the member 10$^a$, as at 30, and a ring 31 being engaged in the recess 27 and provided with a ball-race groove 32 complementary to the ball-race groove 19 of the collar ring 18, which is also disposed in the recess 28, the rings 31 and 18 being secured by swedging the end of the member 10$^a$, as at 33. The operation is essentially the same as that of the first embodiment.

I have illustrated and described preferred and satisfactory embodiments of my invention, but it will be obvious that changes may be made therein within the spirit and scope thereof as defined in the appended claim.

Having thus described my invention what I claim and desire to secure by Letters Patent is:—

In an anti-friction bearing for wheels and the like, a one-piece outer member formed of cylindrical tubing, having an annular ball-race groove upon its inner surface, the diameter of the bore being the same at each side of said groove, an inner member inserted within said bore comprising an annular ball-race portion extending radially outwardly therefrom, a separable annular ring engaged upon said inner member at one side of and adjacent said ball-race portion, said ball-race portion and said ring having complementary annular ball-race grooves radially aligned with said ball-race groove of said outer member, a cylindrical surface at the other side of and adjacent said ball-race portion, and annular retaining means at the other end of cylindrical surface from said ball-race portion extending radially outwardly therefrom, the diameters of said ball-race portion, said annular ring and said annular retaining means being less than the diameter of the bore of said outer member, a series of rollers disposed between said cylindrical surface of said inner member and the bore of said outer member adapted to take radial load, said annular ball-race portion and said annular retaining means adapted to retain said rollers on said inner member against longitudinal displacement with respect thereto, a series of balls disposed in said ball-race grooves of said inner and outer members adapted to take side thrust in both directions, said inner member with said rollers adapted to be inserted in said outer member from either end before assembly of said balls and said separable annular ring, the space normally occupied by said separable annular ring being sufficient when said ring is separated to permit engagement of said balls with said ball-race groove of said outer member and said ball-race portion after insertion of said inner member and said rollers in said outer member, assembly of said separable annular ring adapted through said balls and ball-races to prevent longitudinal relative displacement of said outer and inner members in both directions, and means for securing said removable annular ring in assembled relation.

WALTER F. HEROLD.